Sept. 4, 1934.  W. HEMINGWAY, JR  1,972,300
AUTOMOBILE LOCK
Filed May 8, 1933
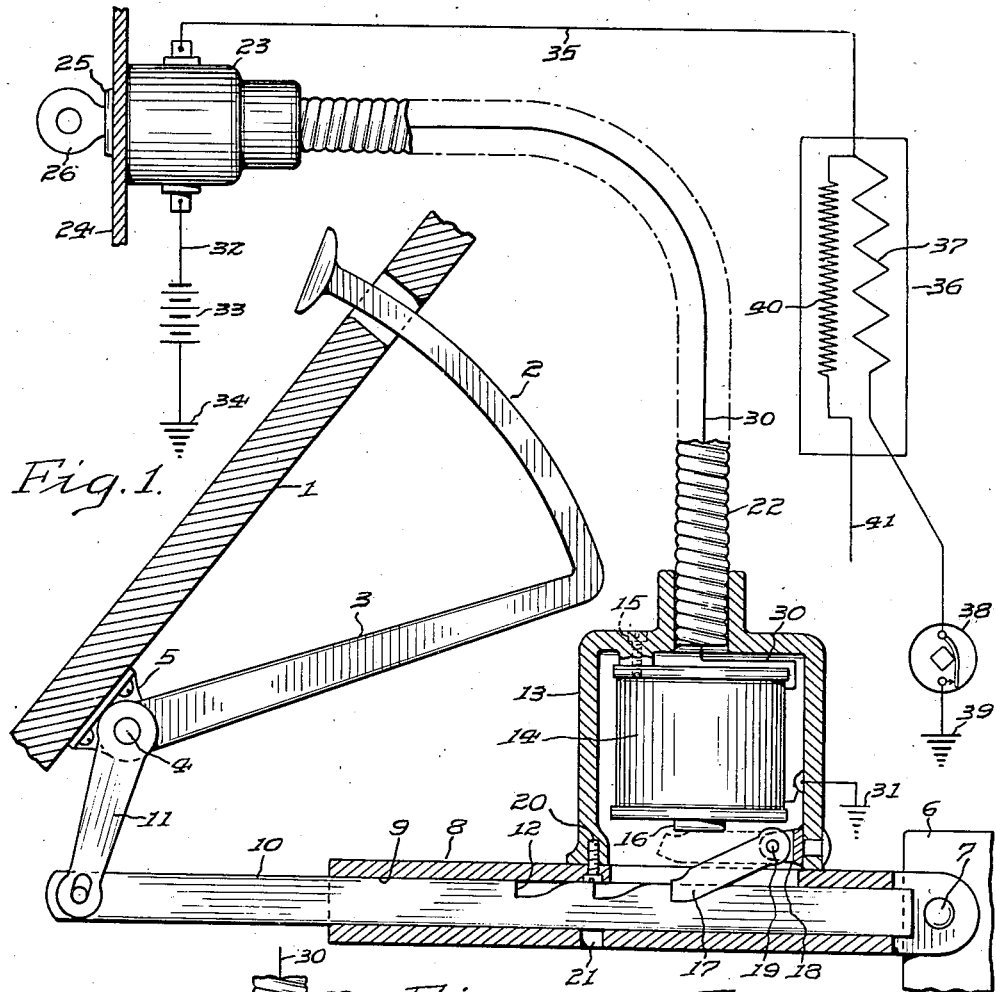
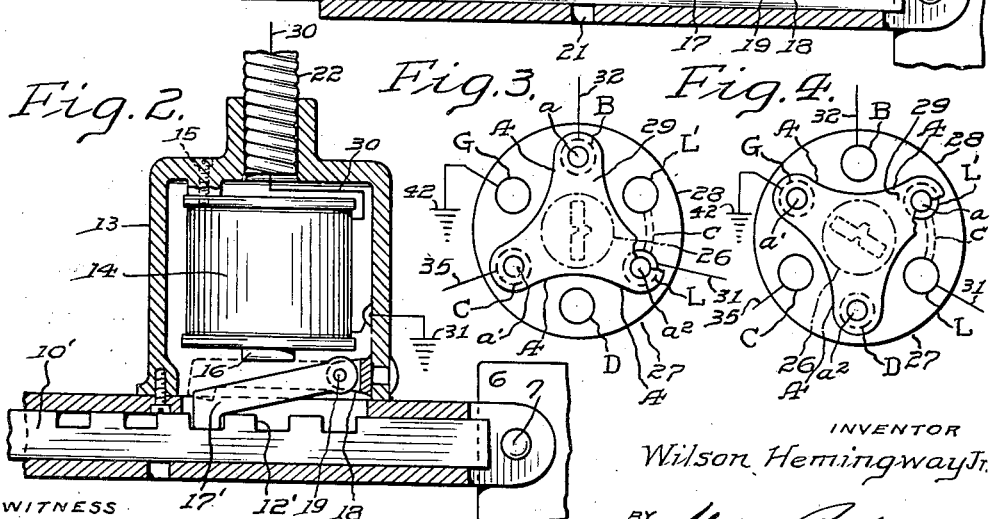
INVENTOR
Wilson Hemingway Jr.
WITNESS
BY
ATTORNEY Patented Sept. 4, 1934

1,972,300

UNITED STATES PATENT OFFICE 1,972,300

AUTOMOBILE LOCK

Wilson Hemingway, Jr., Philadelphia, Pa., assignor to The Electrolock Manufacturing Company, Vicksburg, Miss., a corporation of Mississippi Application May 8, 1933, Serial No. 669,878

1 Claim. (Cl. 70—127)

The present invention relates to locks for automobiles and more particularly to locking mechanisms which simultaneously lock more than one part or function of a car, and one object of this invention is to provide a lock which is electrically actuated, to automatically lock a mechanism, necessary to the operation of the car, in an inoperative position so as to prevent the starting of the motor or the driving of a car by one not authorized so to do, once the car has been stopped and parked, and the switch of the ignition system has been locked in a position in which said ignition circuit is broken.

A further object of this invention is to provide an ignition circuit of an automobile with a supplemental electric circuit connected to and controlled by the ignition switch and the lock therefor on the instrument board of the automobile, operative to lock, when the car is stopped and the ignition system is locked, one of the mechanisms usually controlled by a hand or foot of the operator of the car, in such a position that said mechanism cannot be released or the car operated so long as the ignition circuit to the motor is broken and until the said circuit is closed thereby providing protection against the theft of the car.

A further object of this invention is to provide an electrical control locking device which, without substantial change or construction may be operatively connected to one of the essential levers, hand or foot controlled and necessary to the driving of the car, to lock the same by and simultaneously with the locking of the ignition circuit in open or broken condition, the invention being adapted, for instance, to lock a clutch pedal with the clutch disconnected; to lock the foot brake pedal with the brake applied; to lock an emergency brake with the brake applied; or even to lock the hood of the motor to insure against the tampering with the distributor or coil and to prevent the removal of any of the said elements or other removable accessories and submechanisms as are usually installed under the hood of a car adjacent the motor.

Other objects of this invention will appear in the specification and claim below.

Referring to the drawing forming a part of this specification and in which the same reference characters are employed throughout the various views to designate the same parts, Fig. 1 is a vertical section of a locking mechanism embodying this invention attached to and cooperating with a pedal (clutch or brake) of an automobile and showing the armored connection from the ignition switch and lock on the instrument board to the locking devices, and showing diagrammatically the ignition circuit controlled by said switch;

Fig. 2 is a vertical sectional view of a locking mechanism of a slightly modified construction;

Fig. 3 is a view of the essential of the ignition switch in the position in which the ignition circuit is closed and the supplemental circuit to the supplemental locking device is also closed to the battery and consequently energized; and Fig. 4 is a diagrammatic view similar to Fig. 3, but showing the position of the switch elements when the ignition switch is locked, and the ignition circuit is broken and further showing the manner in which the switch end of the supplemental circuit is grounded through said switch.

Referring to Fig. 1, through the footboard 1 of the floor of an automobile projects the usual reach 2 of the pedal 3, rigidly mounted on the shaft 4, in turn journaled in one or more brackets 5 beneath the footboard 1.

This shaft 3 may be and preferably is the shaft which operates the clutch (not shown) of an automobile, but it may be the pivotal shaft for the foot brake pedal, for if the clutch pedal be depressed and be locked in that depressed position, it is impossible for one to close the clutch to connect the transmission with the motor, and if the foot brake pedal be depressed and so locked it will be impossible for one to release the brakes in order to push or pull the car or drive it under its own power.

The locking device shown in Fig. 1 is therefore adapted to be used in connection with the clutch pedal or the foot brake pedal ordinarily found in present day automobile construction. Further use of the invention with other parts of the car will be referred to again below.

To some convenient part 6 of the chassis, I secure, pivotally or rigidly as by a bolt 7, one end (here shown as the forward end) of a strong metal casing 8 having straight through it an opening 9 preferably rectangular in cross-section and forming a guideway in which a slide bar 10 fits and normally freely slides longitudinally forwardly and rearwardly.

The rear end of the bar 10 is preferably pivotally connected to the free end of the lever 11 which in turn is rigidly secured to and oscillates with the shaft 3. Whenever the pedal 3 is depressed or advanced forwardly, the bar 10 is drawn rearwardly in the casing 8 and when the foot is removed from the pedal, the pedal moves under the usual spring tension and the slide bar 10 moves forwardly in said casing 8. The upper surface of the bar 10 is preferably provided with one or more ratchet teeth 12 as will be referred to again below.

Mounted upon the casing 8 is a relatively small strong housing 13 for the coil of an electromagnet 14, rigidly secured to the top of the housing 13 in any suitable manner, as by screws 15 and depending therefrom. The core 16 of the magnet is above and substantially spaced from the upper edge or side of the slide bar 10.

The armature of the electromagnet 14 is a pawl 17 pivotally mounted in lugs 18 preferably integral with the housing 13 so that the pawl 17 may oscillate in a vertical plane on the pivot pin 19.

The housing 13 may be secured to the casing 8 in any suitable manner, but I prefer to have it so connected that it cannot be removed readily therefrom to give access to the pawl 17. One manner of accomplishing this result is to secure the base of the housing 13 to the top of the casing 8 by screws 20 passing through the upper part of the casing 8, located above the slide bar 10 and accessible only when the slide bar 10 is removed and a screw driver is inserted through the hole 21 in axial alinement with the screw 20.

Securely attached to the upper side of the housing 13 is an armored cable 22 of the character commonly used in protecting the ignition system of an automobile from unauthorized tampering, the other end of said cable being securely attached to the rear end of the ignition switch casing 23 mounted in the instrument board 24. The ignition switch 27 within the casing 23 is controlled by the usual lock cylinder 25 and key 26, the rotation of the cylinder being operative to move the movable member of the switch to different positions with respect to the stationary contact parts of the switch.

The lock cylinder and tumblers may be of the ordinary construction and are installed in the casing in any usual way to permit, upon the insertion of the key, the free rotation of the cylinder, when the key is inserted therein, from one position (wherein the ignition circuit is closed) to a second position (wherein the ignition circuit is broken) and vice versa.

One arrangement of the switch 27 provided with movable and stationary switch members and which is adaptable to my invention, is clearly indicated diagrammatically in Figs. 3 and 4. Thus the stationary contact points of the switch, which are preferably mounted in a stationary member 28 of insulating material, may be six in number, arranged preferably in a circle and spaced equidistant from each other as shown in Fig. 3. The stationary contact B is attached or connected to the battery. The stationary contact point G is connected by a lead to earth. The stationary contact point C is connected by a lead to the ignition coil. The stationary contact point D, in the present arrangement, may be and preferably is dead. The stationary contact point L is adapted to be connected to the supplemental circuit of the locking device forming a part of my invention and including the electromagnet 14, and the stationary contact point L' may be and preferably is connected to the contact point L by a connector c.

The movable member 29 of the ignition switch shown in Fig. 3 is preferably of metal and has three equi-distant arms A, each carrying a contact point $a$, $a'$ and $a^2$ respectively. Said member 29 is preferably rotated by but is electrically insulated from the key cylinder 26, shown in dot-and-dash lines in Figs. 3 and 4.

Now referring back to Fig. 1 within the armored cable 22 is the insulated wire 30, one end of which forms the winding of the coil 14 and is thereafter grounded to the casing as at 31. The upper end of the wire 31 passing through the armored coil is connected to the stationary contact point L of the ignition switch. By virtue of the connector c this wire 30 connects directly with both the contact points L and L'.

Connected to the stationary contact point B is a wire 32 which leads to the battery 33 and thence to ground 34. Connected to stationary contact point C is a wire 35 which leads to the induction coil 36 and thence through the primary current winding 37 to the timer 38 and thence to ground 39. Within the induction coil 36 is the usual secondary winding 40 adapted to be connected by a lead 41 with the spark plugs of the motor (not shown). It is understood that when a wire or terminal is referred to as "grounded" it means that it is connected to a metallic part of the chassis or car which forms an artificial ground for the various circuits.

It will now be seen that when the switch is in the unlocked position shown in Fig. 3 the movable insulated metal contact 29 of the ignition switch will connect the battery 33 through the contact point B and movable contact member 29 with the coil contact C and hence through the wire 35 with the ignition coil, and with the stationary contact point L whereby a portion of the current from the battery 33 will energize the supplemental circuit from the battery through the wire 30 through the electromagnet 14 to the ground 31; that the magnet 14 will be energized and the pawl 17, forming the armature of the electromagnet 14, will be lifted to the position shown in dotted lines in Fig. 1. This condition will remain so long as the switch is in this position and the operator of the car will be at liberty to freely operate the clutch as he may find it necessary or desirable in driving the car. When, however, he parks his car he will, as usual, lock it by throwing the lock cylinder 26 to a position corresponding to that shown in Fig. 4 and in doing so the movable contact member 29 will move away and be out of engagement with the stationary contact point B and will come to rest on the stationary contact point G and on the stationary contact point L'. The engagement of the movable contact member 29 with the dead contact point D will not close any circuit. The contact points G and L' will then be the only ones operatively connected by the movable member 29.

This rotation permits the user to withdraw his key and leave the ignition switch in locked condition, but in so doing he will have connected the wire 30 leading from the electromagnet 14 to ground through the stationary contact point L, connector c, stationary contact point L', movable contact member 29 to stationary contact point G which, as is above stated, is grounded to the machine. The ignition circuit is therefore completely broken and the supplemental circuit to the locking device in addition to being disconnected from the battery point B is grounded at both ends, to wit, at the ignition switch end of the said supplemental circuit at 42 and at the electromagnet end of said circuit at 31 and no current whatever can be thrown through the wire 31 to energize the magnet to lift the pawl 17. The entire supplemental circuit is inaccessible from the outside, and there is no way of breaking from the supplemental circuit between the switch and the casing 13 except by breaking or destroying the armored cable 22 which is not easy to do and thereafter connecting the wire 30 with some other source of electric power.

It will therefore be observed that as soon as the operator of the car parks his car and locks his ignition switch and withdraws his key, thereby deenergizing the electromagnet 14, he merely has to depress the pedal 3 to separate his clutch members or to apply tightly the foot brakes to the wheels. This depression of the lever 3 will draw the sliding bar 10 rearwardly and the pawl 17 will ride over the ratchet teeth 12 until it rests in the last tooth to which the bar has been advanced whereupon a release of the pressure of the foot on the pedal will cause the pawl 17 to engage within the nearest ratchet teeth and prevent any substantial reverse motion of the pedal 3 or a frictional engagement of the clutch members.

If the pedal 3 be the foot brake pedal, the operator will depress the pedal after locking his ignition and apply the foot brake tightly and when he lifts his foot from the pedal the pawl will hold the lever in the position to which it was depressed and the brake cannot be released until the ignition circuit is closed to the battery and with it the supplemental circuit.

The wire 31 being grounded at both ends precludes the application of electric motive power to the wire 31. In fact, the wire is thoroughly protected throughout its length from outside interference and one cannot by pulling on the reach of the pedal force the slide bar rearwardly or disengage the pawl 17 from its notch.

It is only by the insertion of the key 27 in the cylinder 26 and by rotating the cylinder clockwise (as respect to the showing in Figs. 3 and 4) that the ground of the ignition end of the supplemental circuit including the wire 31, is broken, and when the ignition circuit is closed as in Fig. 3, then the supplemental circuit is closed through the electromagnet 14 and the electromagnet is energized whereupon a slight downward pressure on the pedal will relieve the pawl of any pressure due to its engagement with the teeth 12 of the slide bar and the energized electromagnet will lift the pawl 17 clear of the upper surface of the sliding bar 10.

The construction shown in Fig. 2 is substantially like that shown in Fig. 1 except that the device is one in which the bar 10' is provided with notches 12' with square shoulders which cooperate with a pawl 17', the end of which is also provided with square shoulders which prevent any substantial movement of the bar 10' in either direction when once the electromagnet 14 is deenergized and the pawl 17 has fallen into one of the teeth 12'.

This is a modification which is adapted, for instance, for locking the shifting lever in any desired position, e. g., in neutral or in reverse or in low as may be desired, these various notches corresponding to the position in which is the shifting lever to prevent an unauthorized use of the car. The notches 12' of the bar 10' correspond to such positions. If, therefore, after stopping his car the operator adjusts his gear shift to the position in which he wishes to lock it and then locks his ignition, the pawl 17' will fall into a corresponding notch 12' of the bar 10' and the shifting lever cannot be moved from that position until the ignition switch is unlocked and the ignition circuit is restored.

From the above it must also now be apparent that the above device is also well adapted for locking the hood of an automobile in such a way as to prevent an unauthorized person from lifting the sides of the hood or cowl and having access to the inside thereof. In this instance the bar 10' may control a locking bolt of the hood in locked position and no one may slide the bolt to permit him to lift the sides of the hood and have access to the motor until after the ignition switch has been turned to unlocked position, and the ignition circuit is closed and with it the supplemental circuit through the electromagnet 14.

Having thus described my invention, what I claim and desire to protect by Letters Patent of the United States is:

The combination with an ignition circuit of an automobile including a battery, and an instrument-board switch of a supplemental circuit connected at one end to said switch and grounded at the other end, an electromagnet in said supplemental circuit, said switch being operative to simultaneously connect said supplemental circuit to said battery when it connects said ignition circuit to said battery and to ground the switch end of said supplemental circuit when it disconnects said ignition circuit from said battery, and a mechanism controlled by said electromagnet for locking one of the operating mechanisms of the car against operation so long as said supplemental circuit is so grounded at the switch end of said supplemental circuit.

WILSON HEMINGWAY, Jr.